United States Patent
Maccagnan et al.

(10) Patent No.: US 12,337,519 B2
(45) Date of Patent: Jun. 24, 2025

(54) SCREW FOR AN EXTRUDER AND EXTRUDER DEVICE

(71) Applicant: GIMAC DI MACCAGNAN GIORGIO, Castronno (IT)

(72) Inventors: Giorgio Maccagnan, Castronno (IT); Simone Maccagnan, Castronno (IT); Davide Fedeli, Jerago County Orago (IT)

(73) Assignee: GIMAC DI MACCAGNAN GIORGIO, Castronno (IT)

( * ) Notice: Subject to any disclaimer, the term of this patent is extended or adjusted under 35 U.S.C. 154(b) by 0 days.

(21) Appl. No.: 17/263,588

(22) PCT Filed: Oct. 7, 2019

(86) PCT No.: PCT/IB2019/058514
§ 371 (c)(1),
(2) Date: Jan. 27, 2021

(87) PCT Pub. No.: WO2020/075037
PCT Pub. Date: Apr. 16, 2020

(65) Prior Publication Data
US 2021/0283815 A1    Sep. 16, 2021

(30) Foreign Application Priority Data
Oct. 11, 2018  (IT) .................. 102018000009362

(51) Int. Cl.
*B29C 48/50*  (2019.01)
*B29C 48/505*  (2019.01)
*B29C 48/68*  (2019.01)

(52) U.S. Cl.
CPC ........ *B29C 48/509* (2019.02); *B29C 48/6803* (2019.02)

(58) Field of Classification Search
CPC ... B29C 48/509; B29C 48/6803; B29C 47/60; B29C 45/48; B32B 15/00; B05D 3/02;
(Continued)

(56) References Cited

U.S. PATENT DOCUMENTS

| 5,156,860 | A | 10/1992 | Kojima et al. |
| 8,075,661 | B2 * | 12/2011 | Chen ................... C22C 1/051 |
| | | | 419/60 |

(Continued)

FOREIGN PATENT DOCUMENTS

| CH | 669212 A5 | 2/1989 | |
| CN | 85103041 | * 4/1985 | ............. B29C 47/60 |

(Continued)

OTHER PUBLICATIONS

Chivavibul, Pornthep, et al. "Effects of carbide size and Co content on the microstructure and mechanical properties of HVOF-sprayed WC-Co coatings." Surface and Coatings Technology 202.3 (2007): 509-521. (Year: 2007).*

(Continued)

*Primary Examiner* — Alison L Hindenlang
*Assistant Examiner* — Shibin Liang
(74) *Attorney, Agent, or Firm* — Manelli Selter PLLC; Edward Stemberger

(57) ABSTRACT

The extruder screw comprises a screw body (2) coated by an external functionalization coating (4), and also at least partially coated by a wear detection-quantification coating (5) arranged between the external surface (3) of the screw body (2) and the external functionalization coating (4), and detectable with respect to the external functionalization coating (4).

10 Claims, 1 Drawing Sheet

(58) Field of Classification Search
CPC .......... B05D 1/36; B30B 9/122; B30B 9/121; B30B 9/14; B30B 9/12
See application file for complete search history.

(56) References Cited

U.S. PATENT DOCUMENTS

| | | | | |
|---|---|---|---|---|
| 11,052,626 | B2 * | 7/2021 | Ghanimi | ............ B30B 9/14 |
| 2007/0269676 | A1 * | 11/2007 | Singer | ............ C23C 28/023 |
| | | | | 428/685 |
| 2020/0131328 | A1 | 4/2020 | Banerjee et al. | |

FOREIGN PATENT DOCUMENTS

| | | | | |
|---|---|---|---|---|
| CN | 103350490 | B | 10/2015 | |
| DE | 3506668 | A1 | 8/1986 | |
| EP | 0426101 | A2 | 5/1991 | |
| JP | 07204483 | * | 8/1995 | ............ B01F 7/08 |
| WO | 2018019444 | * | 2/2018 | ............ B30B 9/12 |
| WO | 2018019444 | A1 | 2/2018 | |

OTHER PUBLICATIONS

Davis, J.R .. (2004). Handbook of Thermal Spray Technology—Selected References. (pp. 108-119). ASM International. Retrieved from https://app.knovel.com/hotlink/pdf/id:kt008JAM81/handbook-thermal-spray/coating-processing-selected-references (Year: 2004).*
WO2018/01944 machine translation prepared on Mar. 18, 2024 (Year: 2024).*
International Search Report in PCT/IB2019/058514 dated Dec. 20, 2019.

* cited by examiner

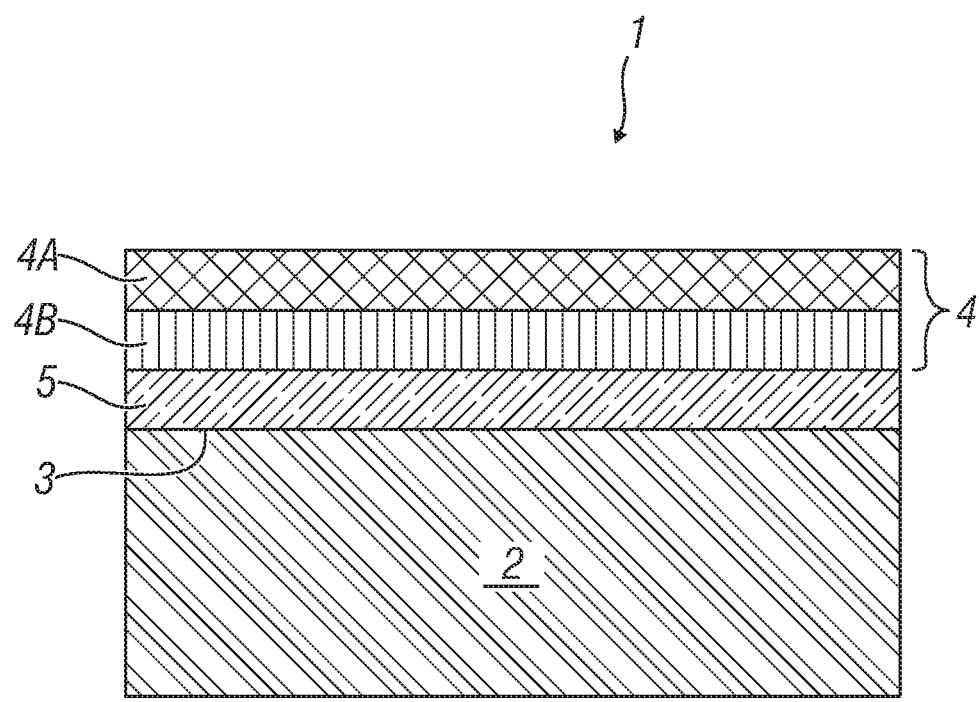

SCREW FOR AN EXTRUDER AND EXTRUDER DEVICE

TECHNICAL FIELD OF THE INVENTION

The present invention refers to a screw for an extruder and also to an extruding device provided with the same screw.

PRIOR ART

Extruding devices are known in the art which are widely used in the industrial field for processing different kinds of materials, particularly polymeric materials.

Typically, the extruding devices comprise a cylinder and a worm screw inserted in the former, rotating the screw enables to advance the processing material towards the cylinder bottom. Such bottom is provided with a wall having a through hole enabling, by the operating screw thrusting the polymeric material, to obtain the extrusion of the material. Usually the screw and cylinder are made of steel or a metal material.

During a normal use of the extruding device, all the parts, which move with respect to the processing material flow, particularly the screw and cylinder, are subjected to stresses causing the wear thereof which generally is a mechanical wear (determined by the friction between the polymeric material and the walls of the screw and cylinder, or the reciprocal friction of such walls), of an electroplating type, of a chemical type (caused by a chemical corrosion caused by the processing material), or a combination of two or all of them.

The wear is determined by the formation of steel or metal particles detaching from the worn parts of the extruding device, particularly from the screw and/or cylinder, and mixing with the processing plastic material. This in turn determines an undesired presence of steel or metal traces in the extruded plastic material.

Sometimes the presence of steel or metal in the polymeric material, even though is negligible, is unacceptable according to the use of the polymeric material, for example, if the extruded material is destined to an application related to biologic functions, such as for example a food or medical grade application.

In order to solve this problem, the prior art provides to coat the parts of the extruding device which come in contact with the processing material (the external surface of the screw and/or the internal surface of the cylinder) by a suitably selected material, so that the involved surfaces are protected and/or to substitute the material contacting the finished product with a bio-compatible material, so that the traces of the material itself in the extruded product do not jeopardize the object.

However, this type of solution does not fully meet the needs of the field, because when the coating is completely worn out, the substrate is anyway exposed to the processed material and also because nowadays it is still difficult to detect the state of the worn coating. Indeed, such detection requires to use a dedicated apparatus or process, which are not easily available in the manufacturing plants.

It is also difficult to foresee the time in which the erosion of the selected material will cause the presence of exposed areas on the screw and cylinder surfaces, in which the wear problem, as explained, will happen again.

BRIEF SUMMARY OF THE INVENTION

Therefore, it is an object of the present invention to provide a screw for an extruder and an extruding device enabling to easily detect the wear state of the screw and cylinder.

Another object of the present invention consists of providing a screw for an extruder and an extruding device enabling to easily quantify the wear state of the screw and cylinder.

This and other objects are met by a screw for an extruder according to claim 1, and by an extruding device according to claim 9.

The dependent claims define possible advantageous embodiments of the invention.

BRIEF DESCRIPTION OF THE DRAWINGS

In order to better comprehend the invention and appreciate the advantages thereof, some exemplifying non-limiting embodiments thereof will be described in the following with reference to the attached drawings, in which:

FIG. 1 is a cross-section view of a portion of the screw for the extruder according to the invention.

DESCRIPTION OF EMBODIMENTS OF THE INVENTION

A screw for an extruder according to the invention is indicated in the attached FIGURE by reference 1. The screw 1 is of a type described in the preamble of the present description and comprises a screw body 2 having an external surface 3 coated by an external functionalization coating 4 (FIG. 1). Preferably, the screw body 2 is made of steel, but can be also made of a generally metal material, of a different type, as is already known to a person skilled in the art.

The external surface 3 of the screw body 2 is at least partially coated by the external functionalization coating 4, preferably completely coated by such coating.

The external functionalization coating 4 is made of a first preselected material which is suitably compatible, from the point of view of the chemical and physical interactions, with the extruding polymeric material, and with the end use of the same. Consequently, the properties of the extruding polymeric material are not changed by the first material, and the presence of traces of the same first material in the end product will not jeopardize its suitability to the foreseen use.

Possibly, the first preselected material comprises two substances mixed together, a first substance compatible with the extruded material and to the future application thereof, and a second substance having a subtractive marker function.

In this case, the external functionalization coating 4 consists of a single layer.

Alternatively, the first and second substances can be possibly separated. In this case, the external functionalization coating 4 comprises two separated layers 4A, 4B, preferably reciprocally contacting, as shown in the example of FIG. 1. The first layer 4A, comprising the first substance compatible with the extruder material and the future application thereof, is arranged outside the second layer 4B, in order to come in contact with the polymeric material during the extruding step. The second layer 4B, comprising the second substance acting as a subtractive marker, is on the contrary arranged inside the first layer 4A, in other words between the first layer 4A and screw body 2 (FIG. 1).

According to the present invention, the screw body 2 is also at least partially coated by a wear detection-quantification coating 5 arranged between the external surface 3 of the body 2 and the external functionalization coating 4, and the wear detection-quantification coating 5 is detectable with respect to the external functionalization coating 4, particularly with respect to the subtractive marker, if present.

The term "detectable", in the context of the present invention, means that a detection can be easily performed without using a measuring apparatus or an analyzing process.

According to the preferred embodiment of the invention, the wear detection-quantification coating 5 is visually distinguishable, from the external functionalization coating 4. Therefore, it is particularly advantageous to provide two coatings having different colors and is still more advantageous that the two colors cannot be mistaken one for the other. In the preferred embodiment, the wear detection-quantification coating 5 is of a yellow or red color, while the external functionalization coating 4 is of a black or grey color. Due to the contrast between the two colors, when the external coating 4 wears out until at least one detection coating area 5 is exposed, this latter is immediately distinguishable by the yellow or red color which stand out from the dark color of the external coating 4. Naturally, other combinations of colors of the two said coatings are possible.

According to an advantageous aspect of the invention, the material in which the wear detection-quantification coating 5 is provided, has a hardness greater than 1500 HV, so that it does not wear out too quickly enabling an user to see the screw 1 wear before corroding the screw body 2. Typically, the detection-quantification coating 5 is made of a material having a hardness in the order of 2000 HV, however can be made of a material having a greater hardness, for example of 5000 or 6000 HV.

It is also preferable to have a predetermined thickness of the wear detection-quantification coating 5, in other words it should be known. Consequently, it is possible to evaluate the screw 1 wear based on the known thickness of the material.

Still more advantageously, the external functionalization coating 4 is also provided with a predetermined (known) thickness for determining the wear thereof. The following will explain how the wear is determined.

Knowing also the hardness and/or strength of the wear detection-quantification coating 5 enables to still better evaluate the coating wear and consequently there is a better control on the time remaining before such coating is completely worn out. Therefore, preferably the material of the wear detection-quantification coating 5 should have a predetermined hardness or a predetermined strength, and still more preferably such material should have a predetermined hardness and a predetermined strength.

If the external coating 4 consists of the two beforehand cited layers 4A, 4B, preferably the subtractive marker (by which the second layer 4B is made) has a hardness greater than the one of the first compatible substance (by which the first layer 4A is made). This enables to more precisely measure the wear of the external coating 4.

Therefore, it is understood that also the wear detection-quantification coating 5 will be subjected to the wear experienced by the screw 1, consequently traces of the respective material are released in the wear detection-quantification coating 5. Consequently, it is particularly useful for the wear detection-quantification coating 5 material not to be incompatible, from the point of view of the chemical and physical interactions, with the extruding material and its future use.

Preferably, the material by which the wear detection-quantification coating 5 is made, is selected among filler materials, nitrides, carbides, carbonitrides, crystalline materials, and diamond. The filler materials can be for example filler ceramic materials, or pure metals as nickel or chromium. The nitrides, carbides and carbonitrides are preferably nitrides, carbides or carbonitrides of: zirconium, tungsten, titanium, aluminum or silicon, however they can be based on other chemical elements.

According to a possible embodiment, the screw 1 comprises also an (adhesive) compatibilizing layer arranged between the screw body 2 and the wear detection-quantification coating 5, and/or between the wear detection-quantification coating 5 and the external functionalization coating 4.

The presence of the compatibilizing layer enables to ensure a good adhesion of the wear detection-quantification coating 5 to the screw body 2 and to the external functionalization coating 4, particularly to the subtractive marker layer 4B if the functionalizing coating 4 consists of two layers 4A, 4B, as illustrated in FIG. 1. The presence of the compatibilizing layer can be made necessary, for example, if the employed materials do not have a sufficient adhesion to each other.

In the example shown in FIG. 1, the wear detection-quantification coating 5 comprises a single layer. However, it is possible to provide such coating with additional two layers or more layers, more preferably two or three layers.

Two layers make easier to detect the screw 1 wear. Three layers make easier and more accurate to measure the screw 1 wear.

Generally, the presence of plural alternated layers, whose thicknesses are known, enables to more precisely quantify the thickness of the layer and therefore to more precisely measure the amount of the coating lost during the extrusion.

In case of two or plural layers, it is possible to provide a single material which is the same for all the layers, or to provide two or plural different materials. It is also possible to provide that such two or plural layers are detectable from each other (with the meaning previously specified), for example by different colors. It can be said that the used layers can have hardnesses, strengths and thicknesses equal or different from each other, since these parameters are predetermined, in other words are known.

Advantageously, the external functionalization coating 4 and the wear detection-quantification coating 5 are of a removable type. Consequently, if they are worn, they can be substituted by simply removing the worn coating and covering the screw 1 with a new coating.

The present invention intends to protect also an extruding device, comprising at least one screw 1 as hereinbefore described, and a cylinder provided with a cylinder body comprisesing an internal recess in which said screw 1 is made to slide. The internal recess has an internal surface adapted to come in contact with the external surface 3 of the screw body 2. The cylinder is provided with an end wall provided with a through hole for extruding a material, for example a polymeric material. The through hole has a shape and size predetermined according to the requirements.

It is also possible to provide the internal surface of the internal recess of the cylinder with an external functionalization coating. This is particularly useful when the cylinder is made of a material which is not compatible, based on chemical and physical interactions considerations, with the material to be extruded, or with its end function.

The internal surface of the internal recess of the cylinder can be also coated by a wear detection-quantification coating, completely analogous to the one used for coating the screw 1.

If the functionalization coating is also provided on the internal surface of the internal recess, the wear detection-quantification coating is arranged between the cylinder body and the functionalization coating, which consequently is in direct contact with the extruding material.

More generally, it is observed that it is possible to coat, by a wear detection-quantification coating, all the parts of the extruding device which can move with respect to the extruding material, for example, the extruding head, or dies or molds.

The present invention intends to protect also an extruding device for extruding a material, comprising a plurality of components whose bodies are coated by an external functionalization coating 4, and wherein at least one of said components which, during the extrusion comes in contact with said extruding material, is at least partially coated with a wear detection-quantification coating 5 arranged between the component body and the corresponding external functionalization coating 4. The wear detection-quantification coating 5 can be detected with respect to the external functionalization coating 4.

The functionalization coating 4, the wear detection-quantification coating 5 and also the possibility of detecting this latter with respect to the first one, are completely analogous to what was beforehand described.

The operation of the screw 1 and extruding device according to the invention is completely identical to the use of standard screws and extruders.

The wear condition of the screw 1 is evaluated by extracting it from the cylinder and visually examining the same.

In order to evaluate the wear detection-quantification coating 5, it is examined the wear on the screw 1, and if it is possible, it is determined the time left for using screw 1. This time is determined as a function of the hardness, strength and thickness of the material of the wear detection-quantification coating 5, since such characteristics are known to an user.

The wear of the external functionalization coating 4 is quantified by observing the wear detection-quantification coating 5 and measuring the area of the zone where the external functionalization coating 4 is absent, this measurement is multiplied by the amount of the thickness of the external functionalization coating 4 itself, since such value is preferably known. In this way, the volume of the external coating 4 dispersed in the material during the extruding step, is obtained.

A person skilled in the art in order to meet specific contingent needs can introduce many additions, changes, or substitutions of elements with other operatively equivalent to the described embodiments of the extruder screw and extruding device without falling out from the scope of the attached claims.

The invention claimed is:

1. A screw for an extruder, said screw (1) comprising:
   a screw body (2) having an external surface (3) coated by an external functionalization coating (4), the screw body (2) and the external surface (3) thereof is a metal material, the external functionalization coating (4) is in a material which is compatible, from the point of view of the chemical and physical interactions, with an extruding material and with the end use of the same, and
   a wear detection-quantification coating (5) at least partially coating said screw body and arranged between said external surface (3) and said external functionalization coating (4), a chosen color of said wear detection-quantification coating (5) being visually distinguishable from a color of said external functionalization coating (4) to identify wear without the use of a measuring apparatus or an analyzing process,
   wherein the wear detection-quantification coating (5) is made of a material selected among filler materials, nitrides, carbides, carbonitrides, crystalline materials, and diamond,
   wherein the wear detection-quantification coating (5) has a hardness greater than 1500 HV, and
   wherein the wear detection-quantification coating (5) comprises at least two wear detection layers, with each wear detection layer being of a color different from other wear detection layer(s) thereof to thereby determine an amount of wear detection-quantification coating lost during extrusion.

2. The screw according to claim 1, wherein the wear detection-quantification coating (5) has a predetermined thickness.

3. The screw according to claim 1, further comprising a compatibilizing layer arranged between the screw body (2) and the wear detection-quantification coating (5) and/or between the wear detection-quantification coating (5) and the external functionalization coating (4).

4. The screw according to claim 1, wherein the wear detection-quantification coating (5) comprises one layer, two layers, or more layers.

5. The screw according to claim 1, wherein the chosen color of said wear detection-quantification coating (5) is red or yellow and the color of said external functionalization coating (4) is black or grey.

6. An extruder device for extruding a material, comprising:
   a plurality of components, each having a metal body coated by an external functionalization coating (4) wherein at least one of said components which, during extrusion, is brought into contact with said material to be extruded, is at least partially coated by a wear detection-quantification coating (5) arranged between the body of said component and the corresponding external functionalization coating (4), and wherein a chosen color of said wear detection-quantification coating (5) is visually distinguishable from a color of said external functionalization coating (4) to identify wear without the use of a measuring apparatus or an analyzing process,
   wherein the external functionalization coating (4) is in a material which is compatible, from the point of view of the chemical and physical interactions, with the extruding material and with the end use of the same,
   wherein the wear detection-quantification coating (5) is made of a material selected among filler materials, nitrides, carbides, carbonitrides, crystalline materials, and diamond,
   wherein the wear detection-quantification coating (5) has a hardness greater than 1500 HV, and
   wherein the wear detection-quantification coating (5) comprises at least two wear detection layers, with each wear detection layer being of a color different from other wear detection layer(s) thereof to thereby determine an amount of wear detection-quantification coating lost during extrusion.

7. The extruder device according to claim 6, wherein the plurality of components comprise:
   at least one screw (1) having a screw body (2) with an external surface (3) thereof coated by the external functionalization coating (4), wherein the wear detection-quantification coating (5) at least partially coating said screw body and arranged between said external surface (3) and said external functionalization coating (4), and a cylinder provided with a cylinder body comprising an internal recess in which said screw (1) is made to slide, said internal recess having an internal surface adapted to be brought into contact with said external surface (3) of the screw body (2), said cylinder being provided with an end wall provided with a through hole for extruding the material.

8. The extruder device according to claim 7, wherein the internal surface of the internal recess is coated by the external functionalization coating (4).

9. The extruder device according to claim 7, wherein the internal surface is coated by the wear detection-quantification coating (5).

10. The extruder device according to claim 6, wherein the chosen color of said wear detection-quantification coating (5) is red or yellow and the color of said external functionalization coating (4) is black or grey.

* * * * *